United States Patent
Wolf et al.

(10) Patent No.: US 8,215,458 B2
(45) Date of Patent: Jul. 10, 2012

(54) FIXEDLY CONNECTED PAD RETAINING SPRING FOR A BRAKE PAD

(75) Inventors: Dennis Wolf, Westlake, OH (US); Martin Ebenhofer, Tann (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 843 days.

(21) Appl. No.: 12/266,924

(22) Filed: Nov. 7, 2008

(65) Prior Publication Data
US 2010/0116600 A1    May 13, 2010

(51) Int. Cl.
*F16D 65/097* (2006.01)

(52) U.S. Cl. .................................. 188/73.36; 188/73.37

(58) Field of Classification Search ............... 188/73.36, 188/73.37, 73.38
See application file for complete search history.

(56) References Cited

U.S. PATENT DOCUMENTS

| 4,360,081 A | 11/1982 | Ito et al. | |
| 4,398,622 A * | 8/1983 | Baum | 188/73.38 |
| 4,643,277 A * | 2/1987 | Bangert | 188/73.38 |
| 4,784,242 A * | 11/1988 | Thioux | 188/73.38 |
| 7,316,301 B2 * | 1/2008 | Roberts | 188/73.37 |
| 2009/0020380 A1 | 1/2009 | Camilo-Martinez et al. | |

FOREIGN PATENT DOCUMENTS

| DE | 30 27 139 A1 | 2/1981 |
| DE | 31 24 631 A1 | 1/1983 |
| DE | 10 2006 034 764 A1 | 6/2007 |
| EP | 0 747 608 A1 | 12/1996 |
| EP | 1 441 141 A1 | 7/2004 |
| GB | 2172352 A * | 9/1986 |

OTHER PUBLICATIONS

The Extended European Search Report dated Apr. 6, 2010 (Six (6) pages).

* cited by examiner

*Primary Examiner* — Thomas J Williams
(74) *Attorney, Agent, or Firm* — Crowell & Moring LLP

(57) ABSTRACT

A system for retaining a back plate of a disc brake pad is described. The system includes an elongated resilient element for applying a force to the back plate, a base of the resilient element extending along an edge of the back plate, contacting the edge along a majority of its length, legs of the resilient element, extending from the base, generating the force applied to the back plate by the base when deformed by a compression element, and retaining elements for preventing axial displacement of ends of the resilient element, and lateral slipping of the resilient element.

33 Claims, 10 Drawing Sheets

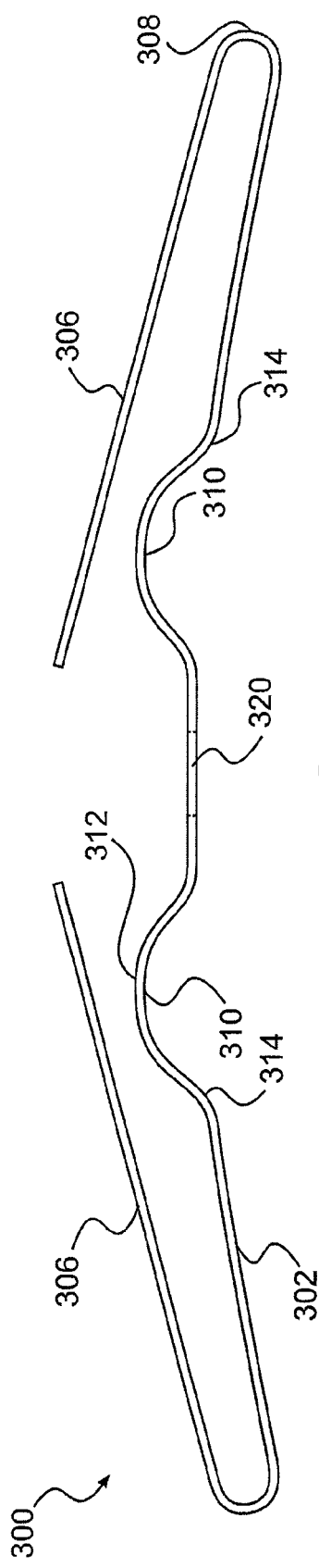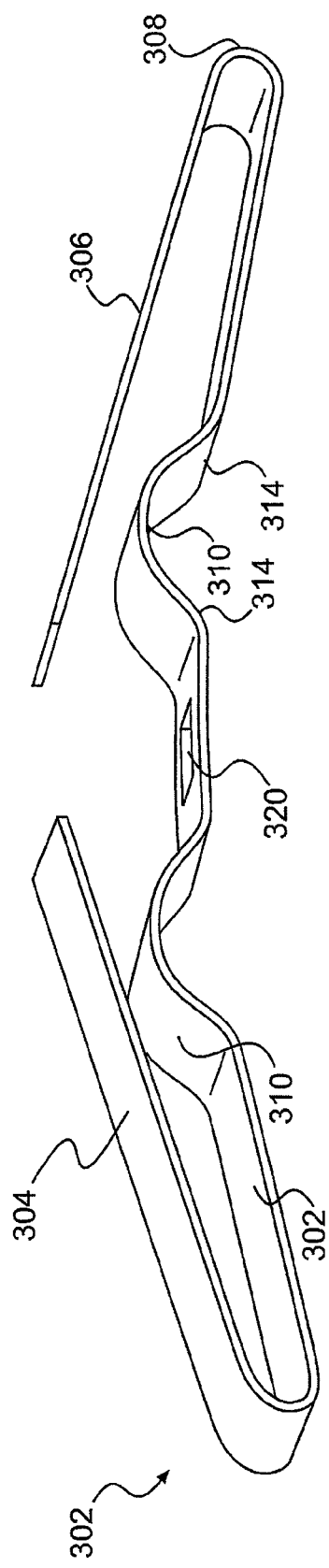

FIXEDLY CONNECTED PAD RETAINING SPRING FOR A BRAKE PAD

BACKGROUND AND SUMMARY OF THE INVENTION

The Present invention relates to devices and methods for mounting brake pads on disc brake systems of vehicles. In particular, the invention relates to retaining elements that are used to help maintain in position the brake pad during operation.

Modern vehicles of all types, including commercial vehicles such as trucks, buses, etc., utilize disc brake systems to slow down and stop. A typical disc brake system includes a rotating rotor (or disc) that is operatively connected to a wheel or hub of the vehicle, and a non-rotating caliper, fixed to the vehicle, used to press brake pads against the rotor, thus slowing the rotor down and stopping it by friction. As the rotor stops, so does the vehicle.

Various mechanisms and devices are used to retain the brake pad or pads in position relative to the caliper. This prevents undesired movement of the pads while mounting the assembly, during movement of the vehicle and during braking. In this manner, the pads are located and oriented correctly when pistons press them against the rotor. In conventional systems, the brake pad may be held in place using a simple spring that is placed on one edge of the brake pad, and abuts a portion of the caliper assembly. For example, a system of this type is described in European patent EP 00534987 B1, which is incorporated herein by reference in its entirety.

In the conventional arrangements, an example of which is shown in FIG. 1, a leaf spring 15 is pressed by holding brackets 7 against the edges of a pad holder 1 formed in the pad lining. Window-like apertures 21 in the wings 23 of the leaf spring receive holding clips 19 formed on the edge of the pad, to prevent undesired release of the leaf spring 15, and to limit its movement to a certain extent.

According to the present invention, an improved method of retaining the brake pads in position relative to the caliper is provided. In the present invention, an improved resilient element is used to apply a force to the brake pad in a more controlled manner. The resilient element according to the invention is attached to the pad more securely, to better control unwanted displacement in the axial and lateral directions relative to the pad. For example, the resilient element may be a spring element, as will be described in greater detail below.

The exemplary pad retaining spring according to the invention may be formed as an insert that can be fixedly connected to the back plate of the pad. The spring may be placed on the back plate in a pre-tensioned manner, and may be fixed to the top side or edge of the pad by lateral protrusions that extend from the surface of the pad's top side, at the outer edges of the spring. For example, these lateral protrusions may extend from the top edge of the pad back plate at two ends, so that the spring fits lengthwise between the protrusions. This prevents the spring from sliding along the pad back plate in a direction along a length of the spring. In this example the top edge of the back plate houses the spring, however, other sides of the back plate may be used, depending on where a pad retaining clamp of the disc brake is applied.

To prevent lateral slipping and unintended removal of the spring, one or more protrusions may be formed generally at the center of the top side of the pad back plate, and may extend through openings or windows formed in a surface of the spring. After mounting the spring on the pad back plate, the protrusions can be clenched, or plastically deformed to expand in a direction parallel to the spring, to lock the spring in place. Alternatively, rivet-like elements may be used for the protrusions. This process protects the spring against loss or inadvertent removal. It also provides a reliable guide to the movement of the spring against the pad back plate, so that lateral movement thereof is controlled.

According to exemplary embodiments of the invention, the spring is shaped so that unwanted movement relative to the pad along its length axis, in this case along the top edge of the pad, is minimized. The force of the spring, or other resilient element, is generated when two discrete lever arms are elastically deformed by, for example, the pad retaining clamp or lever that is used to lock the pad in place within the caliper. The force is then transmitted to the pad's back plate by a base of the resilient element, which extends along substantially the entire length, or at least a majority of the top surface of the back plate. In a different embodiment, more than one resilient element may be used for each back plate of a brake pad, depending in part on the geometry of the pads and the desired force to be applied to the back plate. A resilient force is thus applied to the brake pad by the resilient element, so that the pad is urged in a desired position relative to the caliper.

In one exemplary embodiment, the resilient element is a spring shaped like a compressed "U", in which the two legs are bent inward towards the base at end points of the spring, so that when compressed, the legs become generally parallel to the base.

Other objects, advantages and novel features of the present invention will become apparent from the following detailed description of the invention when considered in conjunction with the accompanying drawing.

BRIEF DESCRIPTION OF THE DRAWING

The present invention is described in the following with reference to the drawing below.

FIG. 5 shows a side view of a different embodiment of a pad retaining spring of a pad retaining mechanism according to the invention;

FIG. 6 shows a perspective view of the pad retaining spring of a pad retaining mechanism shown in FIG. 5;

DETAILED DESCRIPTION OF THE DRAWING

The exemplary embodiments of the invention include an improved pad retaining device that helps retain a brake pad in position in a disc brake assembly. In one embodiment, the device includes a resilient element, such as a spring, that is elongated in an axial direction generally corresponding to a length of the top side edge of the pad's back plate to which the spring is mounted.

According to the invention, the ends of the exemplary spring are securely held by protrusions of the back plate, so that the ends cannot move along the length of the top surface of the back plate. Additionally or instead of the end protrusions, protrusions closer to the center of the spring may be used to limit the spring's movement. For example, the lateral slipping that may occur along the width of the top side edge of the back plate may be restricted by the central protrusions. The central protrusions may extend through slots or windows formed in the spring, or may engage grooves, protrusions or other features of the spring. This is possible because in this exemplary embodiment, the base of the spring substantially espouses the top surface of the back plate along its length. Alternatively, the spring or other resilient element may be located along another side of the brake pad's back plate, depending for example on the geometry of the brake pads.

Figure 1:
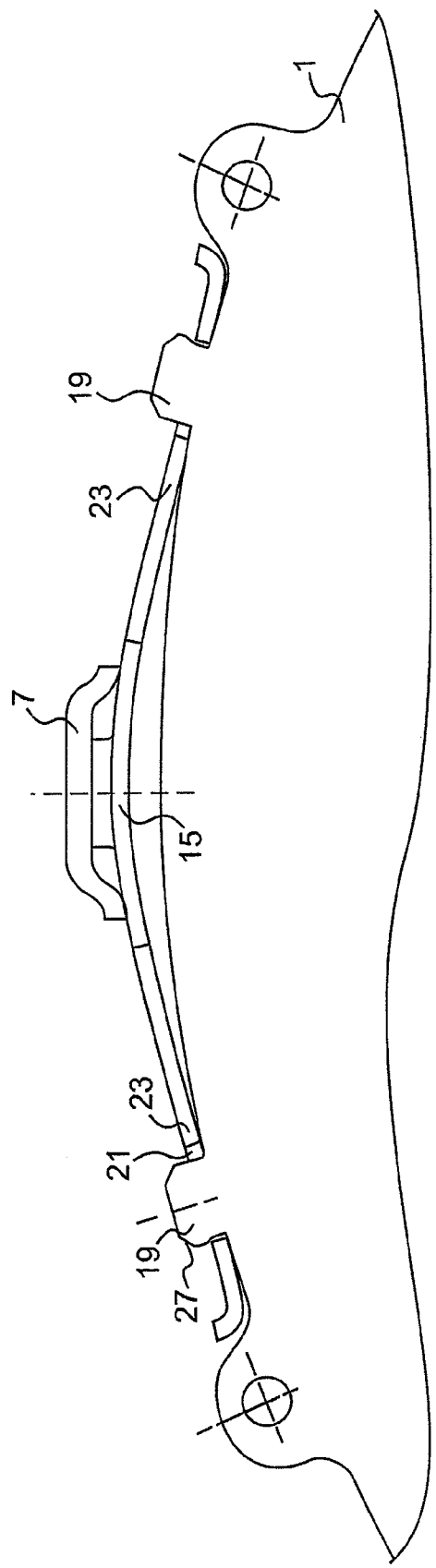
FIG. 1 shows side view of a conventional retaining mechanism for a brake pad.
Figure 2:
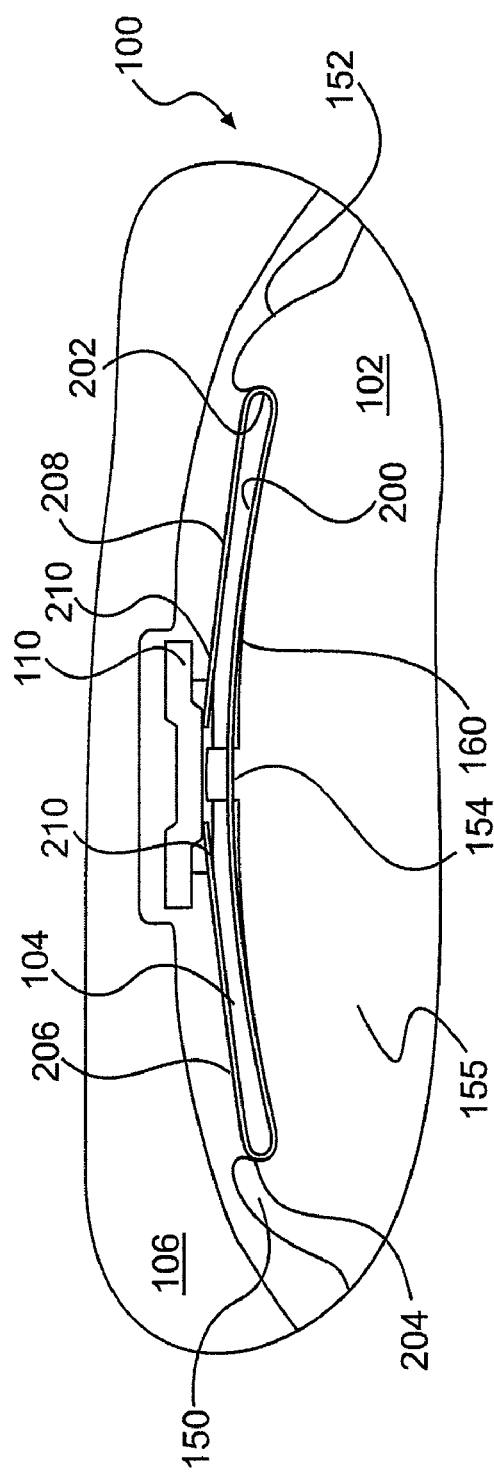
FIG. 2 shows a side view of an exemplary embodiment of a pad retaining mechanism according to an embodiment of the present invention.
Figure 3:
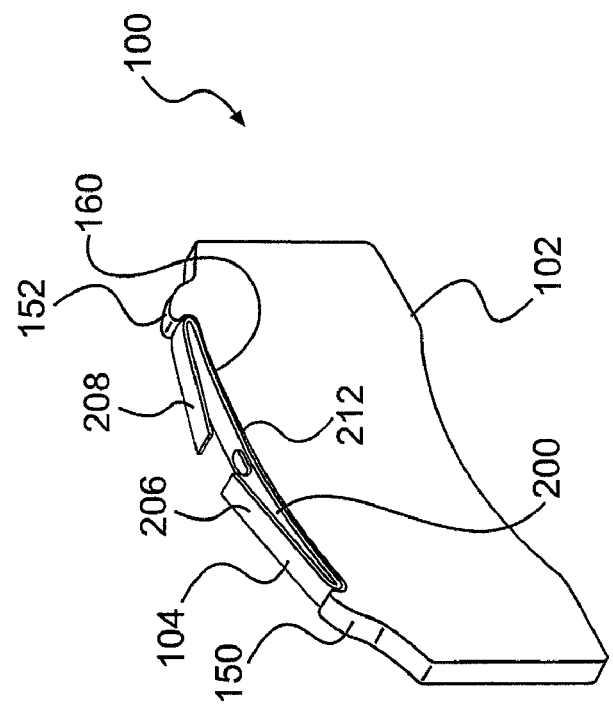
FIG. 3 shows a perspective view of the pad retaining mechanism shown in FIG. 2.

FIGS. 2 and 3 show an exemplary embodiment of the pad retaining system according to the present invention. In this embodiment, a pad 155 adapted to be mounted on a caliper 106 forms part of the disc brake system 100. The pad 155 includes a pad back plate 102 to which the friction material may be attached in a known manner. The back plate 102 has a top edge or top surface 160, on which is mounted the elongated resilient element, for example a spring 104.

Figure 4:
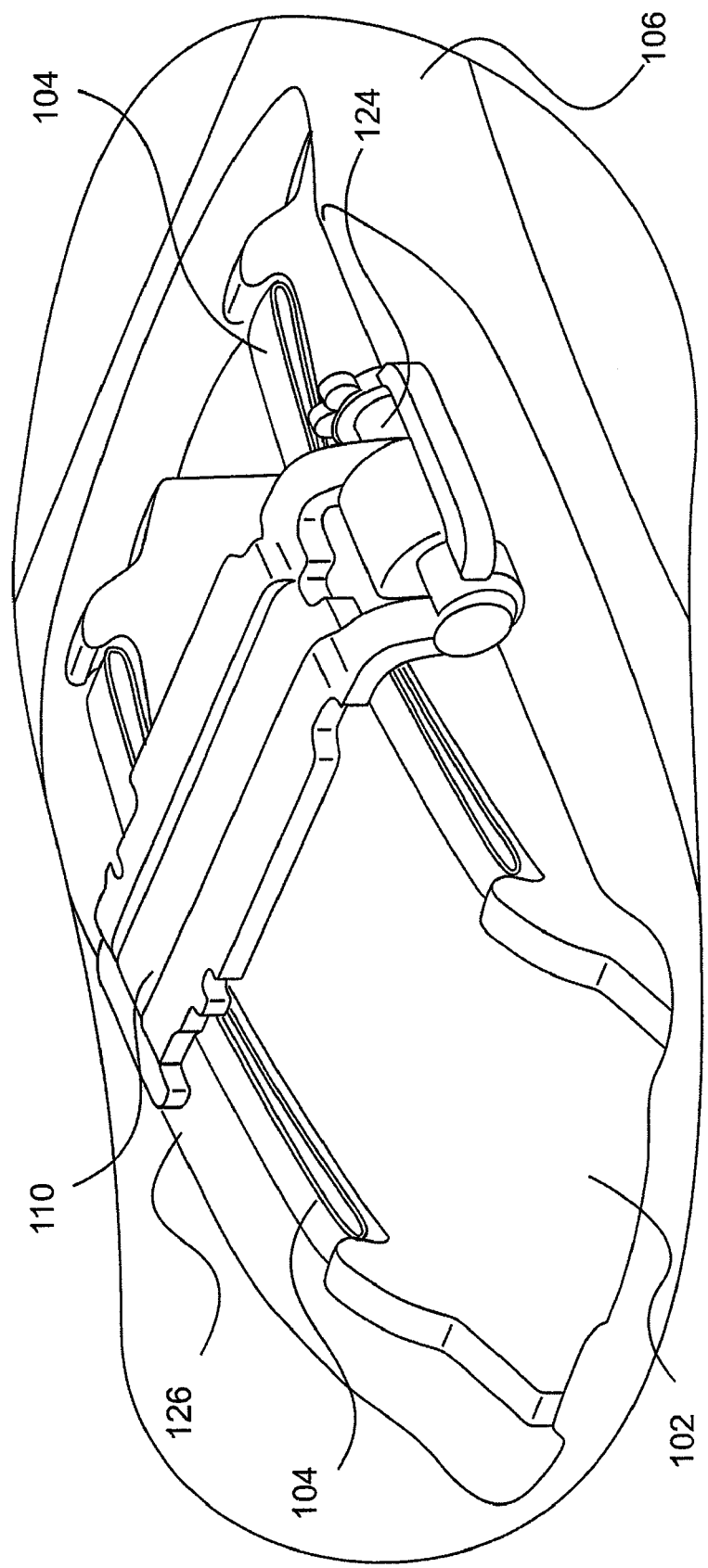
FIG. 4 shows a perspective view of a pad retaining mechanism according to the invention, with a pad retaining clamp.

The exemplary spring 104 is formed of a generally "U" shaped component, in which the spring legs 206, 208 are bent towards the base 200 at the end points 202, 204. The base 200 extends generally along an axial direction, and generally overlies the top surface 160 of the back plate 102. In the free position, shown in FIG. 3, the legs 206, 208 may point away from the base 200. When the spring 104 is compressed, it is elastically deformed from its free state, for example by a compression element such as the pad retaining clamp 110 shown in FIGS. 2 and 4. When this occurs, force is applied to the terminal portions 210 of the legs 206, 208, so that the back plate 102 is pressed down in the correct position within the disc brake assembly 100. In this example, the resilient force is generated by the elastic deformation of the legs 206, 208 relative to the base 200, about the end points 202, 204 of the spring. The force is then transmitted to the top surface 160 by the base 200, substantially along the whole length of the top surface 160.

Those of skill in the art will understand that different embodiments of the pad retaining device according to the invention may have other that two legs as elastic elements. For example, a single leg extending from the base may be used. Alternatively, the tips of the legs may be joined to form a continuous elastic element. Various shapes of the elastic element, including cantilevers and continuous structures, may extend in three dimensions from the base of the retaining element.

In the example shown, the pad retaining clamp 110 pivots about a pivot point 124, so that in the closed position it applies a force to the terminal portions 210 of one or more springs 104, depending on how many brake pads are used. A latching mechanism 126 may be provided to retain the pad retaining clamp 110 in the closed position. In this closed position, the legs 206, 208 of the spring 104 bend about the end points 202, 204, so that a force is transmitted to the back plate 102 via the base 200 of the spring 104.

According to this exemplary embodiment, the spring 104 is secured to the back plate 102 by using retaining elements that may include various protrusions. Two end protrusions 150, 152 may be provided as retaining elements at the ends of the top side 160 of the back plate, to form barriers that limit the displacement of the spring 104 axially, that is in a direction along the length of the back plate's top surface 160. Because the ends 202, 204 abut against the end protrusions 150, 152, and because they are rigidly connected by the base 200 of the spring, neither end can slip axially when a force is applied to the legs 206, 208. Outer surfaces of the ends 202, 204 may be shaped to cooperate with the protrusions 150, 152, to constrain the spring 104 in one or more directions. The specific location and dimensions of the protrusions may be selected depending on the dimensions of the components, and on the forces applied to the spring. This configuration results in a better application of the resilient force of the spring to the back plate 102, so that the pad is kept in place more accurately, and there is less vibration and chatter during operation of the disc brake apparatus.

Additional retaining elements may be used to prevent lateral slipping of the spring 104 against the back plate 102. For example, one or more protrusions 154 may extend from the top surface 160, and may fit in openings, slots, channels or windows 212 formed in the base 200 of the spring 104. These protrusions may be located more centrally on the top surface 160 than the end protrusions 150, 152. The shape and dimensions of the central protrusions 154 and the corresponding windows 212 may be selected to prevent or limit lateral movement along the width of the top surface 160 by the spring 104. Alternatively, a certain amount of movement, or play, may be permitted by the spring 104.

In another embodiment, the protrusions may be used to secure the spring 104 to the back plate 102, so it cannot be removed unintentionally. For example, the central protrusion may be clenched, peened, or otherwise plastically deformed towards the top surface 160, so as to expand laterally and prevent removal of the spring 104. In a different embodiment, the end protrusions 150, 152 may also be plastically deformed to restrict undesired removal of the spring.

The exemplary embodiments of the present invention provide a pad retention system that provides a more uniform and controllable force applied to a large portion of the top surface of the pad. In some cases, it may be desirable to provide a changing force, for example by designing the resilient element as a progressive spring. The progressive spring may use, in addition to the flexing of the legs, an amount of flexing of the base to provide secondary force generation. This configuration may be well suited, for example, in retaining in position the pads when the vehicle travels over rough, unprepared terrain, and subjects the pad to large forces. In this context, the term "progressive spring" is meant to indicate a spring that provides multiple spring constants as it is compressed. In one example, the spring constant may vary linearly or otherwise smoothly as the compression distance of the spring varies. Alternatively, the spring constant may include a step variation for a given compression distance.

An exemplary embodiment of a progressive spring having multiple spring constants is shown in FIGS. 5 and 6. This progressive spring 300 is designed to provide a progressive spring constant when a pressure is applied to the legs 304, 306, for example by a pad retaining clamp 110. In this embodiment, deflecting the legs 304, 306 an initial amount results in a force increasing according to a first spring constant of the device. This first spring constant results from the deflection of legs 304, 306 relative to the base 302, about end points 308. Additional or continued deflection results in a greater spring constant.

In one exemplary embodiment, when the legs 304, 306 enter in contact with progressive spring elements, such as the curved portions 310 of the base 302, a cumulative spring constant of the spring 300 is generated. In this case, the spring constant results from the deflection about end points 308 and also the deformation of the curved portions 310 about radii 314, relative to the base 302, when the top 312 of each curved portion 310 is pressed by the legs 304, 306. Because of the presence on the base 302 of the radii 314, in proximity of the windows 320, a progressive force dependant on spring deflection is generated. This configuration is useful in limiting movement of the brake pads when extreme forces act on them.

Those of skill in the art will understand that different forms of the progressive spring elements may be used, in addition to the curved elements 310. For example, a resilient element with a base and/or end portions of different thickness, surface area and curvature may be used to achieve the variable spring coefficient. Different material or assemblies containing multiple different materials may also be used, as well as alloys and superalloys having the necessary mechanical properties. Instead of the curved portions 310, for example, portions with more complex shapes may be used, to achieve a desired spring coefficient as a function of the compression of the legs 304, 306. The progressive spring coefficient thus obtained may be linear or may have other desired characteristics of spring force as a function of the distance of compression of the spring. The progressive spring elements need not be part of the base 302, but instead may be separate elements that may be attached, secured to or otherwise maintained in place at a desired location on the progressive spring 300.

Figure 7:
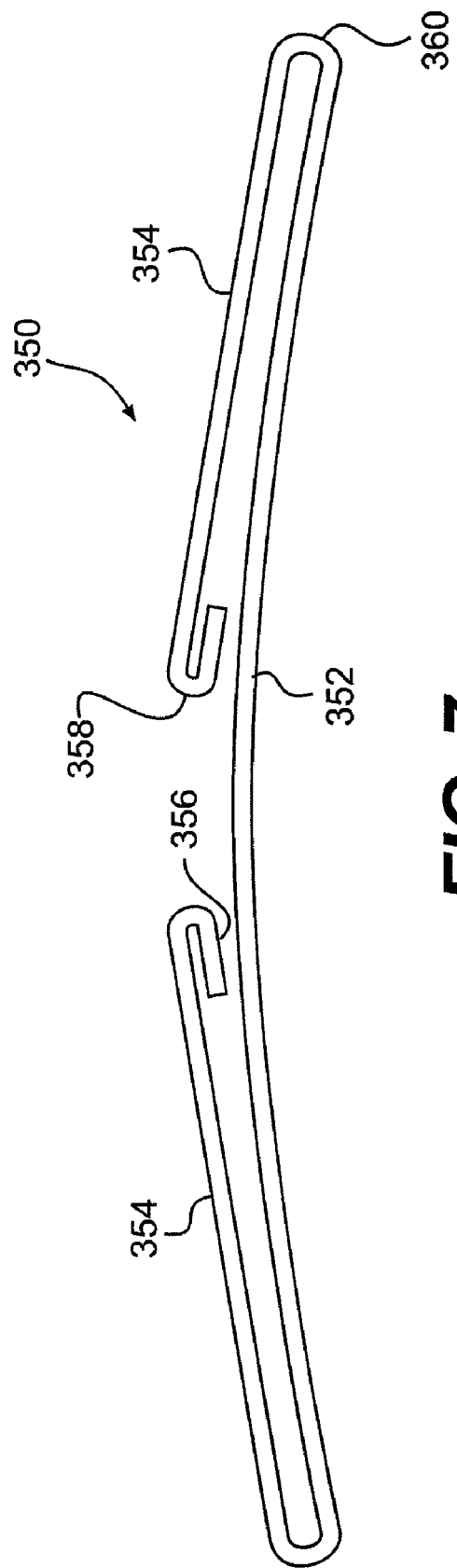
FIG. 7 shows a side view of a third embodiment of a progressive force pad retaining spring according to the invention.
Figure 8:
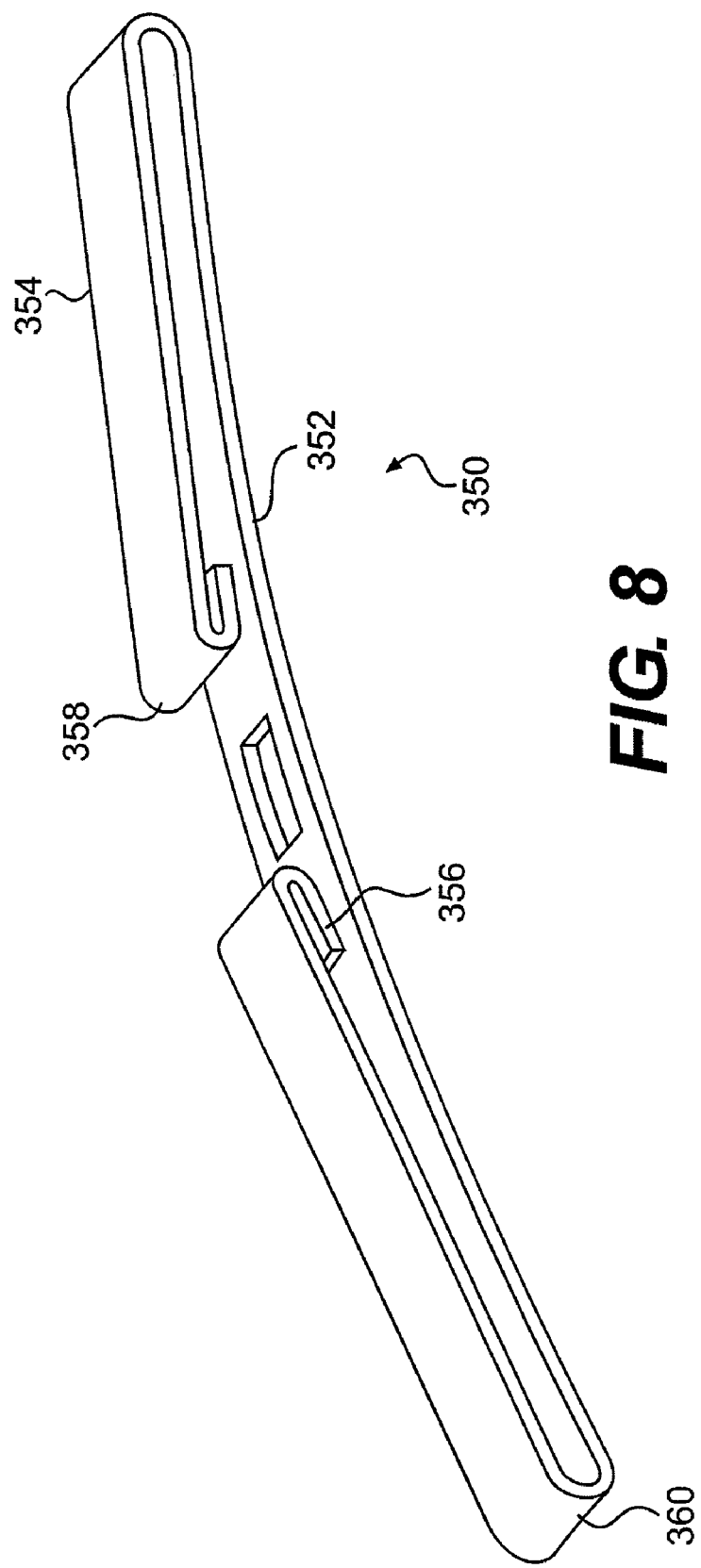
FIG. 8 shows a perspective view of the spring shown in FIG. 7.

In one different exemplary embodiment shown in FIGS. 7-8, a progressive spring 350 is designed to provide multiple spring constants as it is compressed. Two elastic elements 354 extend from the base 352, as in previous embodiments. Secondary elastic elements 356 are attached to the elastic elements 354 at one end, and at the other end contact the base 352 when the spring is compressed. A first spring constant results as the leg or legs of the elastic elements 354 move about end point 360 relative to the base 352. A second spring constant results from the movement of the secondary elastic elements 356 about end points 358, after they contact the base 352.

Figure 9:
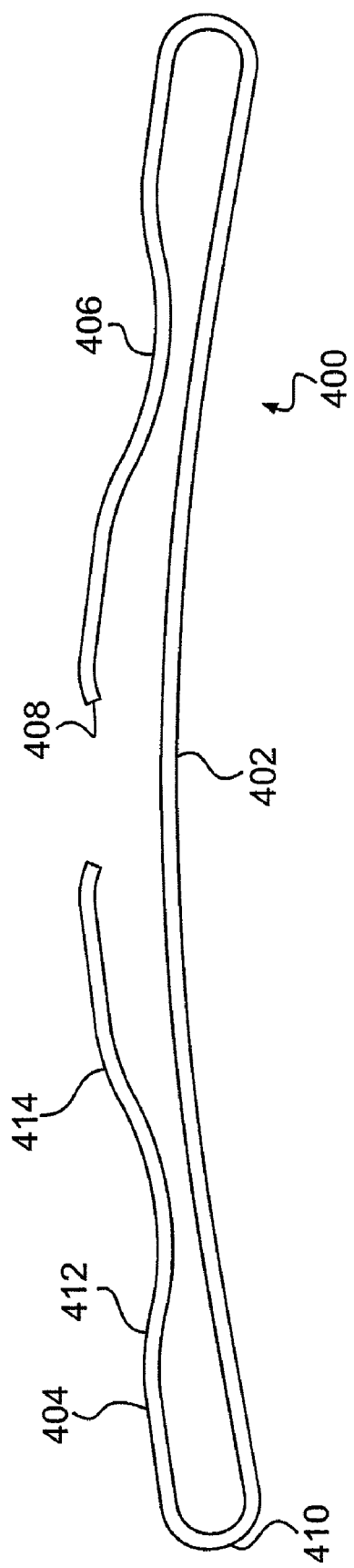
FIG. 9 shows a side view of a fourth embodiment of a progressive force pad retaining spring according to the invention.
Figure 10:
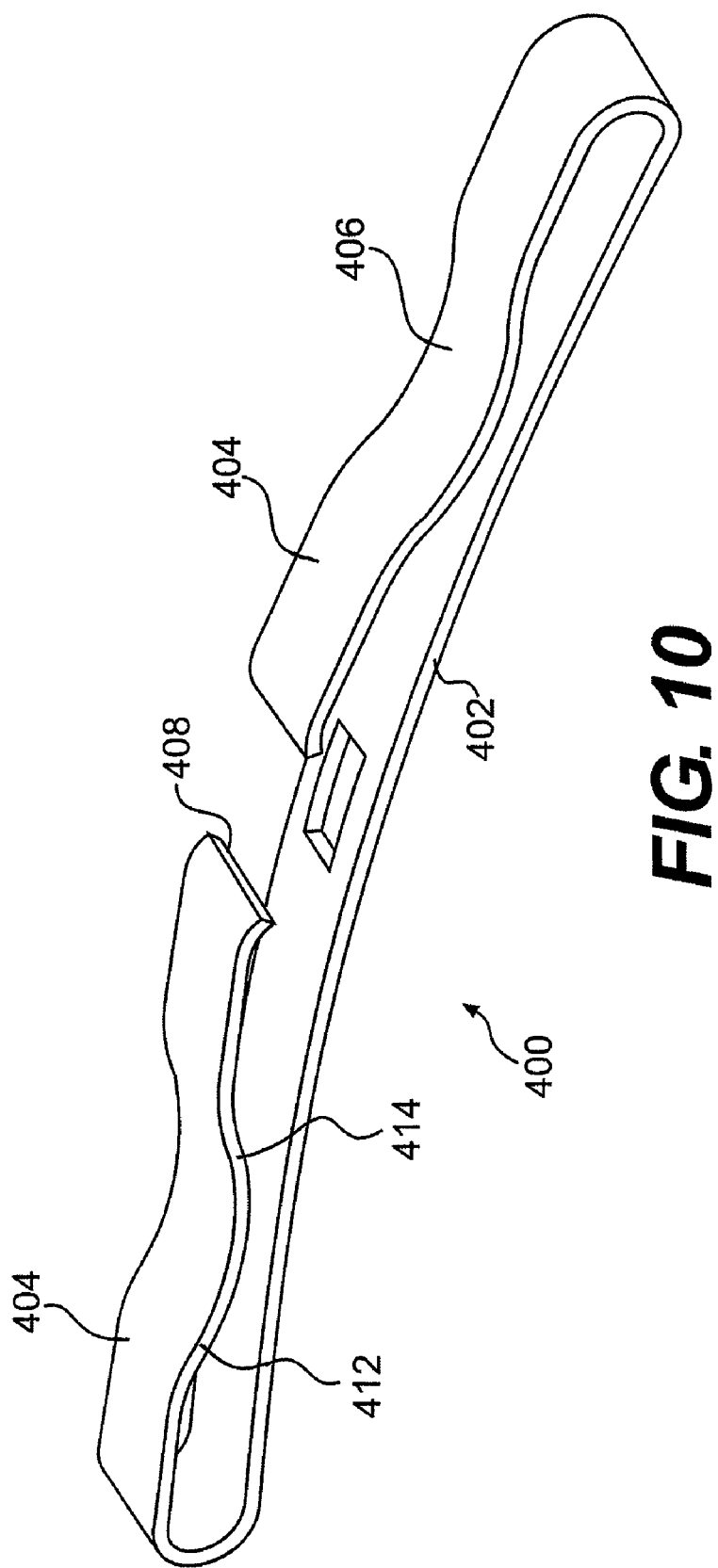
FIG. 10 shown a perspective view of the spring shown in FIG. 9.

In another exemplary embodiment, the progressive spring 400 shown in FIGS. 9-10 achieves a spring constant that varies with the compression of the spring by providing curved portions 406 to the elastic element or elements 404. In this embodiment, the legs of the elastic elements 404 move relative to the base 402 about end points 410, providing a first spring constant. When the curved portions 406 contact the base 402, additional spring constants result from the bending about points 412, 414, providing the desired progressive spring constant characteristics. In this exemplary embodiment, the ends 408 of the elastic elements 404 are curved towards the base 402, to prevent digging into the retaining clamp.

Figure 11:
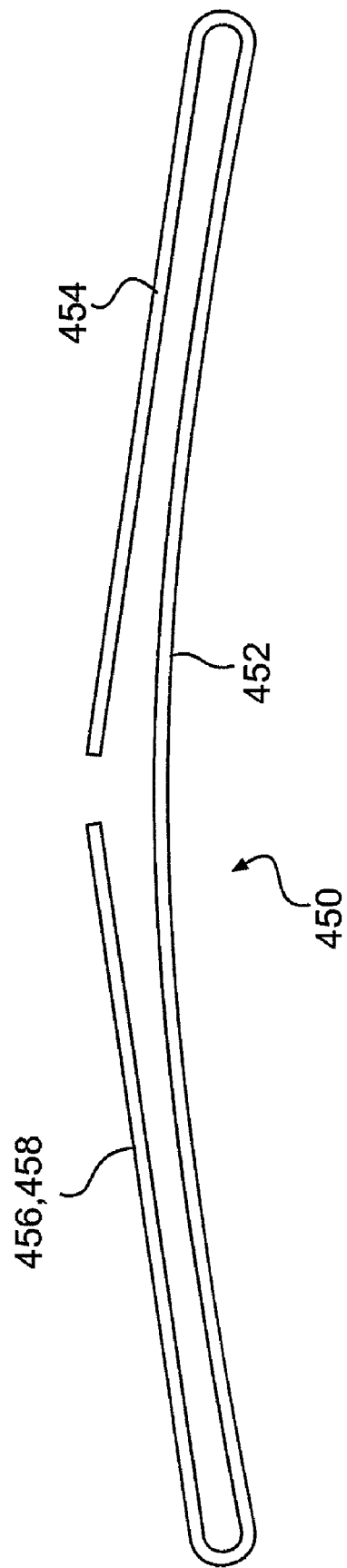
FIG. 11 shows a side view of another embodiment of a pad retaining spring according to the invention.
Figure 12:
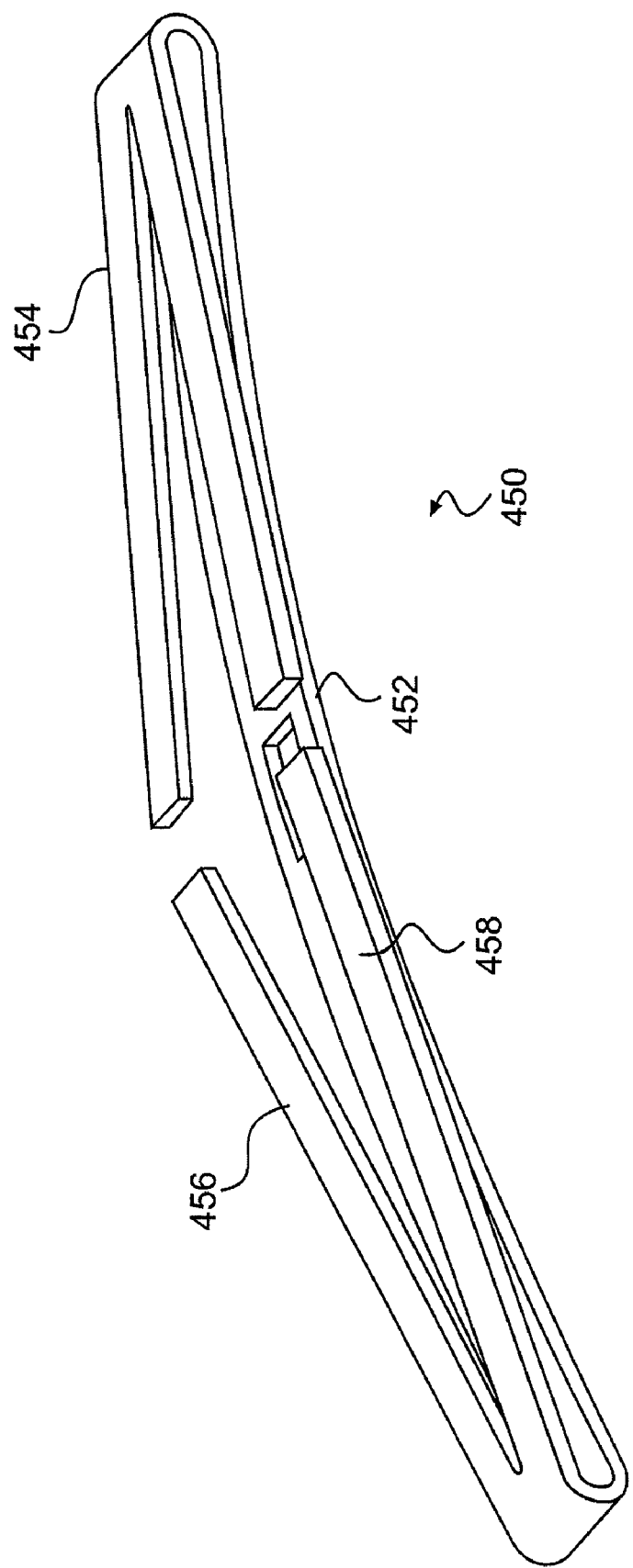
FIG. 12 shows a perspective view of the spring shown in FIG. 11.

FIGS. 11 and 12 show another exemplary embodiment of the resilient element according to the invention. The spring 450 in this embodiment has a base 452 from which extend two elastic elements 454, each including two legs 456, 458. The ends of the legs 456, 458 may diverge from the base 452, providing a smaller profile of the spring, and a larger area of application on which acts the retaining clamp.

Those of skill in the art will understand that different combinations of the elements described above may be provided in a retaining system for disk brakes. Although the exemplary embodiments described above are generally symmetrical with respect to a longitudinal and a lateral axis of the resilient element, in other embodiments one or both symmetries need not be maintained.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for retaining a back plate of a disc brake pad, comprising:
    an elongated resilient element for applying a force to the back plate;
    a base of the resilient element extending along an edge surface of the back plate, the base extending over the edge surface along a majority of a length of the edge surface;
    at least one leg of the resilient element, extending from an end of the base toward a center of the base, generating the force applied to the back plate by the base when deformed by an associated compression element; and
    retaining elements for preventing axial displacement of ends of the resilient element, and lateral slipping of the resilient element.

2. The system according to claim 1, wherein the retaining elements comprise protrusions extending from the edge surface of the back plate for retaining the resilient element.

3. The system according to claim 1, wherein the associated compression element is a pad retaining clamp.

4. The system according to claim 1, wherein the elongated resilient element is a spring.

5. The system according to claim 4, wherein the spring is generally "U" shaped, with legs bent from ends of the base towards the center of the base.

6. The system according to claim 2, wherein the protrusions include end protrusions on the back plate for preventing axial movement of end points of the resilient element.

7. The system according to claim 2, wherein the protrusions include at least one center protrusion on the back plate for preventing lateral sliding of the resilient element.

8. The system according to claim 2, wherein at least one of the protrusions is plastically deformable to fix the resilient element to the back plate.

9. The system according to claim 2, wherein at least one of the protrusions is one of cold worked and hot worked to retain the resilient element to the back plate.

10. The system according to claim 1, wherein the retaining elements comprise rivets adapted for retaining the resilient element to the back plate.

11. The system according to claim 1, wherein the elongated resilient element comprises a spring having progressive force characteristics.

12. A retaining spring for a disc brake pad, comprising:
    a base portion for mounting on an edge surface of a back plate of the disc brake pad, the base portion having a length sufficient to extend over a majority of a length of the edge surface of the back plate;
    an elastic element extending from the base portion at an end point thereof toward a center of the base portion, the elastic element being elastically deformable to generate a resilient force applicable to the back plate via the base portion;
    surfaces of the end point of the base portion shaped to cooperate with end protrusions of the edge surface to restrict axial movement of the base portion; and wherein a portion of the base portion is configured to cooperate with at least one center protrusion of the edge surface to restrict lateral sliding of the base portion.

13. The retaining spring according to claim 12, wherein the portion of the base portion cooperates with the at least one center protrusion to prevent removal of the retaining spring from the back plate.

14. The retaining spring according to claim 12, wherein the portion comprises at least one of a slot, an opening, a window, and a groove.

15. The retaining spring according to claim 12, further comprising the back plate, wherein at least one of the end and at least one center protrusion of the back plate are plastically deformable to secure the retaining spring to the back plate.

16. The retaining spring according to claim 12, further comprising the back plate, wherein at least one of the end and at least one center protrusion of the back plate are deformable by one of hot or cold work to secure the retaining spring to the back plate.

17. The retaining spring according to claim 12, wherein the retaining spring has a "U" shape defined by the base portion and a pair of legs bent towards the center of the base portion.

18. The retaining spring according to claim 12, further comprising a terminal portion of the elastic element adapted for abutting a pad retaining clamp.

19. The retaining spring according to claim 12, wherein the retaining spring provides a progressive force when deformed.

20. The retaining spring according to claim 19, further comprising progressive spring elements of at least one of the base portion and the elastic element.

21. The retaining spring according to claim 20, wherein the progressive spring elements comprise curved portions of the retaining spring.

22. The retaining spring according to claim 20, wherein the progressive spring elements comprise portions having variations of at least one of thickness, cross sectional shape, and material.

23. The retaining spring according to claim 12, further comprising progressive spring elements adapted to generate desired characteristics of spring force as a function of compression of the retaining spring.

24. A brake pad holder, comprising:
a back plate of a brake pad, having a surface;
an elongated resilient element for applying a force to the back plate;
a base of the resilient element having a length sufficient to extend over a majority of a length of the surface of the back plate;
at least one elastic element of the resilient element, extending from an end of the base toward a center of the base, generating the force applied to the back plate by the base when the resilient element is deformed; and
retaining elements of the back plate, cooperating with portions of the resilient element for preventing axial displacement of ends of the resilient element, and lateral slipping of the resilient element.

25. The brake pad holder according to claim 24 wherein the retaining elements comprise at least one protrusion deformable to secure the resilient element to the back plate.

26. The brake pad holder according to claim 24, wherein the resilient element comprises a generally "U" shaped spring.

27. The brake pad holder according to claim 24, wherein the elongated resilient element is a progressive force spring.

28. The brake pad holder according to claim 27, further comprising portions of the elongated resilient element providing a progressive spring constant.

29. The brake pad holder according to claim 28, further comprising progressive portions of the elongated resilient element having at least one of a curved portion, a portion of different thickness, a portion of different cross section, and a portion of a different material.

30. The brake pad holder according to claim 24, wherein the retaining elements are deformable by one of cold work, hot work and plastic deformation.

31. A brake pad retaining system, comprising:
resilient means for generating a resilient force retaining the brake pad in a desired position relative to a brake caliper, the resilient force being applied on a majority of an edge surface of a back plate of the brake pad; and
retaining means for limiting axial displacement and lateral slipping of the resilient means relative to the brake pad, and for preventing unintentional removal therefrom; wherein
the resilient means generates the resilient force when deformed by a compression element of the brake pad retaining system.

32. The brake pad retaining system according to claim 31, wherein the resilient means further comprises resilient means for providing a progressive spring constant.

33. The brake pad retaining system according to claim 31, wherein the retaining means is plastically deformable to retain the resilient means.

* * * * *